(12) United States Patent
Jansson

(10) Patent No.: US 6,402,175 B1
(45) Date of Patent: Jun. 11, 2002

(54) FRONT WHEEL SUSPENSION FOR PREFERABLY A MOTORCYCLE

(75) Inventor: Lars Jansson, Enskede (SE)

(73) Assignee: Öhlins Racing AB, Upplands Väsby (SE)

( * ) Notice: Subject to any disclaimer, the term of this patent is extended or adjusted under 35 U.S.C. 154(b) by 0 days.

(21) Appl. No.: 09/588,347

(22) Filed: Jun. 7, 2000

(30) Foreign Application Priority Data

Jun. 7, 1999 (SE) .............................. 9902107

(51) Int. Cl.⁷ .............................. B62K 25/08

(52) U.S. Cl. .................... 280/276; 180/219

(58) Field of Search ................ 280/276, 277, 280/279, 281.1; 180/219, 220

(56) References Cited

U.S. PATENT DOCUMENTS

| | | | | |
|---|---|---|---|---|
| 5,050,699 A | * | 9/1991 | Savard | 180/219 |
| 5,156,231 A | * | 10/1992 | Trema | 180/227 |
| 5,249,650 A | * | 10/1993 | Tanaka | 188/344 |
| 5,361,864 A | * | 11/1994 | Tanaka | 180/219 |
| 5,599,034 A | * | 2/1997 | Brigden | 280/276 |
| 5,799,963 A | * | 9/1998 | Berkmann | 280/276 |
| 5,813,684 A | * | 9/1998 | Baron | 280/276 |
| 6,036,211 A | * | 3/2000 | Nohr | 280/276 |

FOREIGN PATENT DOCUMENTS

| | | |
|---|---|---|
| DE | 737728 | 7/1943 |
| DE | 94 04 873.8 | 6/1994 |
| DE | 195 03 047 | 8/1996 |
| DE | 196 33 692 A1 | 2/1998 |

OTHER PUBLICATIONS

"Legend Bike", Jul. 14, 1993, pp. 62–63, Gruppo Beditore SRL, Via Dow Vercesi 19, 20091 Bresso, Italy.
Brizio Pignacia, "Gilera Saturn", 1993, Giorgio Nada Editore, Vimondrone (Milano), Italy.
"Italian Motorcycles, Classic Sports Bikes", 1984, pp. 16–17, Osprey Publishing Ltd., London.
H.W. Bonsch, "Einfurung in die Motorradtechnik", Motorbuch Verlag, München (no publishing date found in the reference, believed to have been published around 1980).
Motorcyclist, Jan. 1987, pp. 47–53.

* cited by examiner

Primary Examiner—Avraham H. Lerner
(74) Attorney, Agent, or Firm—Connolly Bove Lodge & Hutz, LLP

(57) ABSTRACT

In a front wheel suspension on a motorcycle, the front wheel is mounted in rearward-sloping supporting members which, in turn, are mounted on the chassis of the vehicle by bearing units comprising link elements and a springing function. The supporting member and the wheel are turnable about a steering line which slopes in a corresponding manner to the supporting members. The bearing units form separate upper and lower bearing units, which are provided with bearing units in or about which the supporting members and the wheel are turnable. Preferably, the upper bearing unit of the bearing units acts as a combined bearing and steering linkage member for the supporting members. The bearing units are torsionally rigid in their respective planes, which extend through the respective securement points or bearings of the bearing units in the chassis and the supporting members. The upper bearing unit of the bearing units is arranged compliantly for torsion or turning motions which arise in the bearing unit when the supporting member and hence the wheel are allotted steering or turning motions or assume steering or turning positions which differ from the longitudinal axis of the vehicle.

32 Claims, 10 Drawing Sheets

FRONT WHEEL SUSPENSION FOR PREFERABLY A MOTORCYCLE

TECHNICAL FIELD

The present invention relates to a front wheel suspension for a vehicle having only one front wheel, by which is primarily meant a motor cycle. In the front wheel suspension, the wheel is mounted in at least one preferably rearward-sloping supporting member which, with the aid of or via bearing units comprising link elements and possibly a springing function, is/are in turn mounted on the chassis of the vehicle. The bearing units allow springing motions in a springing direction for the supporting member, produced by means of connection to a shock absorber or spring function. The bearing units also effect torsional rigidity against the cross-directional action of the supporting member relative to the chassis, viewed in the longitudinal section of the vehicle. Moreover, the bearing units forcibly steer the supporting member in its motions in the said longitudinal section during the said springing motions.

PRIOR ART

A resilient front wheel suspension on, for example, motor cycles is currently realized principally as a telescopic springing or telescopic fork in which inner tubes and outer tubes are mutually longitudinally displaceable and supported one upon the other by means of bushes. The wheel is in this case mounted in the one tube or tubes, whilst the other tube or tubes is/are secured in the chassis. The securement in the chassis is usually realized in connection with a so-called fork crown (triple clamp) to which also the handlebar of the motor cycle is secured. The known arrangement operates with a steering joint and a sliding joint. The telescopic arrangement is rearward-sloping and a steering line for the motor cycle is likewise sloping (essentially parallel with the sloping of the telescopic arrangement) and extends down through the centre of turn of the handlebar, somewhat to the side of the centre of turn of the wheel and further down to a position on the ground plane or the support surface somewhat in front of the point of contact of the wheel with the ground plane or support surface (compare the concept "trail"). The term "steering line" constitutes a recognized concept and purely general reference is made to this. The bearing of the telescopic arrangement is realized at a relatively high level above the ground plane. Upon braking of the wheel, the securement is acted upon by torque. Moreover, the braking gives rise to a weight displacement force which endeavours to compress or boost the compression of the telescopic arrangement in a dive motion. Additional forces generated in the braking of the motor cycle can hereupon produce up to double jounce motions. The telescopic arrangement can be realized with different or desired springing or motion geometries. This term too is a recognized concept, to which purely general reference is made. Thus, for example, the motor cycle/telescopic arrangement can be provided with special so-called "anti-dive" arrangements, which oppose or produce desirably low dive effects in the event of braking actions with or on the front wheel. The telescopic arrangement has a relatively low rigidity and can be subjected to torsional oscillations of a self-oscillation nature (wobbling), which have to be compensated with component(s) in one way or another. High clamping loads can arise in the said fork crowns (upper and lower fork crowns). The inner and outer tubes in the telescopic arrangement are often long and the lateral forces upon the tubes mean that these can be locked to one another in certain travel situations in which the locking can occur by way of the bushes.

With a view to overcoming the weaknesses of the telescopic arrangement, in vehicles/motor cycles of this kind, attempts have been made to replace the telescopic fork with various types of link systems. Reference is made, inter alia, to the magazine "Motorcyclist/January 1987", pages 47–53, which shows a variety of resilient front wheel suspensions with link systems which are intended to replace the springing function produced with the telescopic fork, which link systems are disposed between wheel supporting member(s) and the chassis. Reference is also made to the so-called "Webb" fork, which was used on motor cycles during the period 1920–1940.

It is also conceivable to try to transfer wheel suspension principles from four-wheeled vehicles (cars) to the present context. There are however no acceptable working proposals in existence for such transfers.

DESCRIPTION OF THE INVENTION

TECHNICAL PROBLEM

There is a general need to be able to eliminate all the drawbacks attached to the use of various telescopic fork constructions. Thus, for example, a greater freedom of choice is sought with regard to the procurement of a desired spring geometry, which will be able to be realized, moreover, without the use of complex and expensive additional components. The risk of self-oscillations (wobbling) at certain vehicle speeds has to be able to be effectively eliminated by simple means. There is also a need to be able to reduce the clamping forces in the securements of the wheel-supporting member in the chassis, inter alia by means of the facility to arrange separate securement functions at a relatively low height above the ground surface and thereby avoid tightly spaced bearing points high up in connection with the handlebar. There is also a requirement to be able to eliminate the need to mutually separate springing elements and steering linkage, in which the steering linkage hitherto often had to be relatively weakly dimensioned on structural engineering grounds, inter alia with a risk of the said self-oscillation tendencies within certain of the speed ranges of the vehicle. The invention sets out to solve these problems, inter alia, by proposing bearing or link units which produce distinct positions and motion diagrams for the supporting member by exhibiting high rigidity in certain directions and by exhibiting compliance for torsion or twisting motions which arise in the bearing unit arrangement in the event of torsional steering motions of the supporting member.

In connection with the introduction of the said link unit functions, it is important to overcome the deficiencies which hitherto attach to known link unit arrangements. A major drawback with these is a substantially reduced contact sensation for the driver between the handlebar and the ground surface or roadway. The invention sets out to solve this problem also and proposes a front wheel suspension offering contact sensation characteristics between the handlebar and the roadway equivalent to those which obtain with telescopic arrangements.

The known link unit systems additionally have relatively complex structures for the springing and steering functions per se and/or for components proposed to form part of these functions. The invention sets out to solve this problem also.

In certain types of motor cycles, for example special-purpose motor cycles, cross-country motor cycles, etc., it is important to be able to propose symmetrical wheel suspensions which can allow large wheel deflections or wheel turns. The use of swivelled-out links which extend by the side of the wheel is therefore inadmissible, but rather the link arrangement must be able to be applied above the front wheel so that it is as low as possible above the ground plane. The invention solves this problem also.

According to the present invention, the spring geometry (or the motion geometry) shall be adjustable by the choice of lengths of the bearing units and/or of the link elements and/or of their reciprocal angles and/or angles in relation to a horizontal line, everything viewed in the longitudinal section of the motor cycle (or vehicle) in question in, for example, upright or standing position. The invention solves this problem also.

According to the present invention, bearing unit(s) forming part of the subject of the invention shall be able to be arranged with certain compliance for certain torsion or twisting motions. The invention solves this problem also and proposes measures for the structure and choice of material in the unit(s) concerned, which measures produce an expedient compliance function.

According to the invention, two link units shall be able to be used in a mutual functional interplay, when the supporting member (the wheel) is steered up in spatial terms, and shall hence clear the way for an improved and expedient steering of the motor cycle in co-existence with an expedient springing function. The invention solves this problem also.

According to the invention, the chassis shall be able to bear and steer the supporting member with mounted front wheel without giving rise to risks that the supporting member will oscillates or move around its securements in the chassis, everything viewed in a horizontal section through the motor cycle, the link units and the supporting member. The invention solves this problem also.

In one embodiment of the invention, in a lower link unit a ball joint bearing is used in the securement of the link unit in a wheel-supporting member. Standard ball joints are already produced for this purpose, which can therefore be used in the present invention.

THE SOLUTION

A front wheel suspension according to the invention can principally be deemed to be characterized in that the bearing units mentioned in the introduction consist of mutually separate upper and lower bearing units, which are provided with bearing members in or about which the said supporting member(s) and hence the wheel are turnable. The first of (or one of) the said upper and lower bearing units acts as a combined bearing and steering link member for the said wheel supporting member(s) and the wheel. The said first bearing unit is further arranged compliantly for torsion or turning motion which arises in the first bearing unit when the said supporting member(s) and the wheel are allotted steering or turning motion or assume a steering or turning position which differs from the longitudinal axis of the vehicle (i.e. where the steering deflection=0).

The upper bearing or link unit can in its horizontal view be configured as a tetragon (square, rectangle, trapezium, etc.), the securement points of the link unit in the supporting member(s) being situated at the two front corners and the securement points of the link unit in the chassis being situated at the rear corners.

In a preferred embodiment, the bearing member of the first or the upper bearing or link unit is secured to the rear parts of the link unit by or by means of a first bearing which extends in the longitudinal direction of the link unit and which can here comprise a transverse first bearing axle. The said supporting member(s) can be mounted on the upper link unit on the front parts thereof by or by means of a second bearing, for example a second bearing axle, which likewise extends in the transverse direction of the upper link unit. The said torsion or turning motion in the said plane through the upper link unit induces opposite turning or actuation motions on the first and second bearings or the bearing axles about an imaginary longitudinal axis through the plane (which longitudinal axis coincides with the longitudinal axis of the vehicle). Also included in the said preferred embodiment is that the bearing member of the upper link unit has a first part (bearing part) which coincides with the steering line, mentioned in the introduction, in the said initial position for the springing function and which can be mounted in a bearing housing secured to the chassis. The bearing member of the upper link unit can also comprise a pivoted second part, viewed in the longitudinal section of the vehicle, which at the back (i.e. in the direction of the rear parts of the vehicle) passes into interaction with the said first bearing or bearing axle. The pivoted second part can widen rearwards in its latitudinal direction so as to acquire a width at the back which essentially corresponds to the rear width of the upper link unit. The springing function of the upper link unit can thus be able to be effected by means of link elements extending in the forward direction of the link unit. With the securing function(s) of the link elements in the said first and/or second bearing(s) or bearing axle(s), rotatable bearing functions are created. The first part of the bearing member can be mounted in a bearing housing containing one or more ball bearings and the longitudinal axis of the first part coincide with the said steering line in an initial position for the springing function.

In one embodiment, the bearing member of the lower link unit is configured such that it consists of or comprises a ball joint. The lower link unit can further have an essentially triangular horizontal view in which the bearing member/ball joint of the lower link unit is situated at the apex of the triangle and the securement point(s) to the chassis is/are situated at the corners on the base of the triangle. The rear bearing of the link unit, which, for example, can be constituted by one or more bearing axles, extends in the transverse direction of the vehicle, for example along the whole or parts of the base of the said triangle. A springing-effecting function can herein be arranged on or in the bearing members and/or securements of the lower link unit in the said wheel-supporting member or chassis. In addition, sought-after spring geometry (or motion geometry) for the supporting member can be able to be chosen by means of longitudinal extent(s) on the link elements of the link units in the principal longitudinal sections of the link units or vehicle. The spring geometry pursued by means of the link units can also, by way of supplement or alternative, be choosable by means of mutual angular adjustment(s) relative to a horizontal line through the longitudinal section of the vehicle between or for the link elements extending in the longitudinal direction of the vehicle. The steering-up function can further be able to be chosen by means of sizing of the dimensions of the first and/or second bearing parts and/or by means of choice of material. The said dimensions can herein relate to diameter or diameters, width and/or thickness and the said choice of material can relate to metal, composite, alloy, etc.

In a preferred embodiment, the rigidity of the bearing or link units in their respective horizontal planes is chosen by means of the link elements of the link units, which link elements extend in the transverse direction, and/or the constitution or thicknesses of the link elements and/or choice of material. In a preferred embodiment, the upper link unit consists of or comprises a U-beam shaped link element in, for example composite, alloy or metal material. The first and second bearings or bearing axles can here be arranged on the rear and front sides of the U-beam. The upper and lower link units can further be configured to prevent the occurrence of significant oscillation tendencies for the supporting member(s) in the horizontal plane of the link units in relation to the securement points or the respective bearing in or on the chassis. Alternatively, the first bearing unit can be constructed from individual link elements, for example two side link elements connected by means of a diagonal link element. The said spring geometry operates with springing motion for the wheel/supporting member(s), which is made up of a motional component coinciding with the rearward slope or the steering line and a motional component which has a part which is substantially vertical or which coincides in the vertical direction or longitudinal section of the vehicle. The wheel can be non-resiliently mounted in the said supporting member(s). The upper link unit can also be constructed to support the handlebar, steering wheel or equivalent of the vehicle. Both the link units are further preferably situated above the wheel and the lower link unit is situated directly above the wheel. The number of supporting members can be two and the wheel is mounted between the supporting members. The twisting or the torsion motion of or in at least the first link unit is related to allotted steering force, which can be progressively or linearly increasing in dependence upon the wheel turning position. The lower bearing element can be constituted by a leaf spring or wing damper arrangement which is secured to the supporting member by a ball joint and articulated, or be secured by a torsion or wing damper function to or with a bearing belonging to the chassis. The wheel suspension members are elongated and can in one embodiment be configured so as to imitate the forks in a conventional telescopic fork structure.

ADVANTAGES

As a result of that which has been proposed above, new paths are opened up for being able to achieve resilient and well-defined suspension systems for front wheels, for example on motor cycles, which suspension systems are technically sound and are developed from economically beneficial components. Reliable link elements units comprising link elements can be used and the number of components in the link units can be constituted by just a small number of components. Composite, metal and/or alloy material can be used in an noncritical manner. The appearance of the telescopic function or telescopic fork can easily be imitated. Similarly, the advantages of the telescopic function (such as the sensitivity with the ground surface) can be utilized, whilst at the same time all its disadvantages are eliminated. Similarly, the advantages of the known link unit systems can be utilized, whilst at the same time all its disadvantages of complexity, expensive components, link element tractions which impede wheel manoeuvring and, in the course of driving, of relatively large wheel turning steer-outs according to the above, are eliminated. Large parts of the new link system arrangement can be constituted by standard elements and tried and tested material.

As a result of the invention, the bearing function of the upper link unit for the wheel supporting member(s) is put together with previously used separate linkage, which clears the way for a technically simple and economical solution. Weight displacement due to braking can effectively be prevented from having a prominent effect upon the springing function, for better driving safety. The link element structure proposed in one embodiment is extremely advantageous and offers a host of structural engineering advantages with exceedingly good springing and steering characteristics for the motor cycle. The wheel suspension system can be used on all types of motor cycles, including motor cycles for road usage. A torsionally rigid and simple wheel supporting member suspension is therefore present in the chassis, combined with good springing functions for the member(s) and the front wheel.

DESCRIPTION OF THE FIGURES

A currently proposed embodiment of a device having the characteristics indicative of the invention will be described below, with simultaneous reference to the appended drawings, in which.

DETAILED EMBODIMENT

Figure 1:
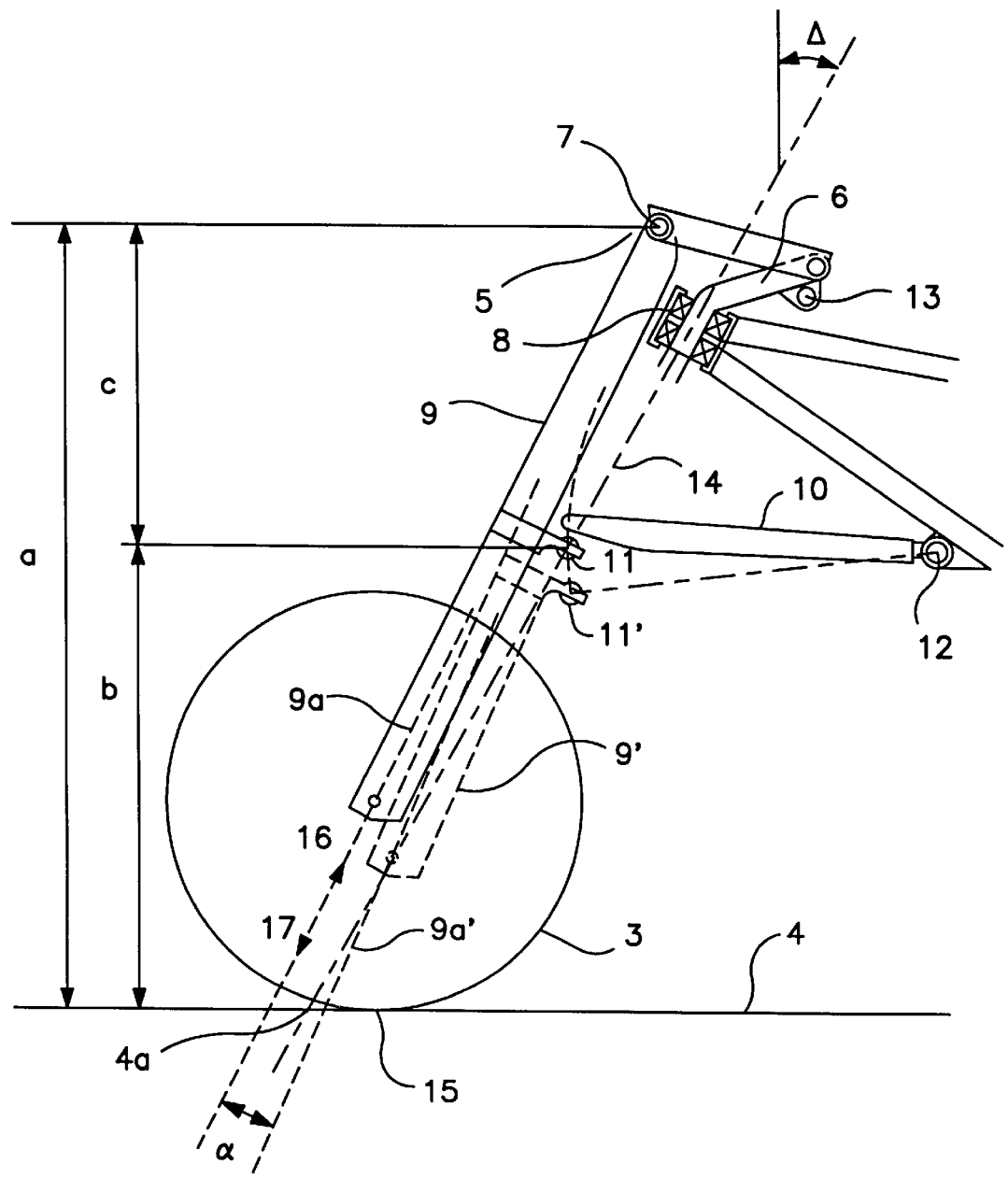
FIG. 1 shows in side view front parts of a motor cycle

In FIG. 1, the front parts of a motor cycle, or pedal cycle (so-called mountain bike) are shown. The invention can be used on current commonly found motor cycles of various types, for example cross-country motor cycles, road-usage motor cycles, etc.

Since the invention is attributable primarily to just the front wheel suspension of such a motor cycle, only the said front parts which are affected by the solution have been shown here in order to facilitate the description of the invention.

The chassis (frame) of the motor cycle is symbolized by 2 and the front wheel in question by 3. The motor cycle is placed or driven on a support surface 4. The invention is characterized, inter alia, in that it has an upper bearing or link unit 5 having associated first bearing members 6 and 7. By means of the bearing member 6, the upper link unit is mounted in a bearing housing 8 secured in the chassis 2. Supporting members, belonging to the motor cycle, for the wheel 3 are secured or mounted in the bearing member(s) 7.

The motor cycle also comprises a lower bearing or link unit 10 having second bearing members 11 and 12. The bearing member 1 consists of a below-described ball joint, by means of which the supporting member 9 is mounted on the second or lower link unit. The bearing member 12 comprises a bearing function for a part (the chassis frame) belonging to the chassis 2. The supporting member 9 can consist of a single supporting member having two parallel supporting elements, on which supporting member or elements the wheel 3 is mounted in its hub 3a, the mounting being effected in a conventional manner.

The invention is characterized, inter alia, in that the said upper and lower link units 5 and 10 are separate or separated. In FIG. 1, an initial position for a spatial position determining function established with the link units 5 and 10 is shown. In this initial position, the upper bearing or link unit is placed at a distance a above the ground plane 4, and the second or lower bearing or link unit is placed at a distance b above the ground surface 4.

The invention is also characterized in that a pronounced distance c is present between the upper and lower link units, i.e., these are not tightly spaced as is the case with current telescopic forks. The distance b is chosen preferably such that it is somewhat greater than the diameter of the wheel 3. The distance a can generally assume values within the range 0.8–1 meter. The distance c is chosen to constitute ¼ to ⅓ of the distance a. In FIG. 1, a handlebar is also indicated using the notation 13.

In FIG. 1 there is also shown a steering line 14, which is a conventional concept in connection with motor cycles. The steering line extends in principle through the upper bearing 8 and obliquely downwards/forwards in connection with the hub 3a of the wheel 3 to a point 4a on the ground plane which lies somewhat in front of a point 15 representing the point of contact between the wheel 3 and the ground surface. The distance between the points 4a and 15 constitutes the so-called "trail". The steering line thus slopes rearwards from the said point 4a in the view according to FIG. 1. The supporting member 9 is also arranged such that it slopes rearwards and the longitudinal axis or axes 9a of the supporting member extend(s) essentially parallel with the steering line 14, or vice versa. The upper and lower link units 5 and 10 are arranged to allow springing motions in the principal longitudinal extent 9a of the supporting members 9 in the directions of the arrows 16 and 17, the direction 16 indicating jounce motion and the arrow 17 indicating rebound motion from the initial position shown in FIG. 1. The task of the link units is to assign predetermined distinct motions to the supporting member during the springing and steering process. Also indicated in the figure with dashed lines are positions 9', 9a' and 11' which the supporting member 9, its longitudinal axis 9a and the ball joint 11 respectively can assume in a certain driving situation. Such a situation arises when a rebound motion in the direction of the arrows 16 or 17 is present in relation to the initial position shown in FIG. 1. This driving situation therefore causes the ball joint 11 to leave its position in or on the steering line 14. In FIG. 1, an angle a is shown. This angle is dependent upon the existing turning parameters of the wheel. The greater the wheel deflection and jounce, the greater the angle value, and vice versa.

Figure 2:
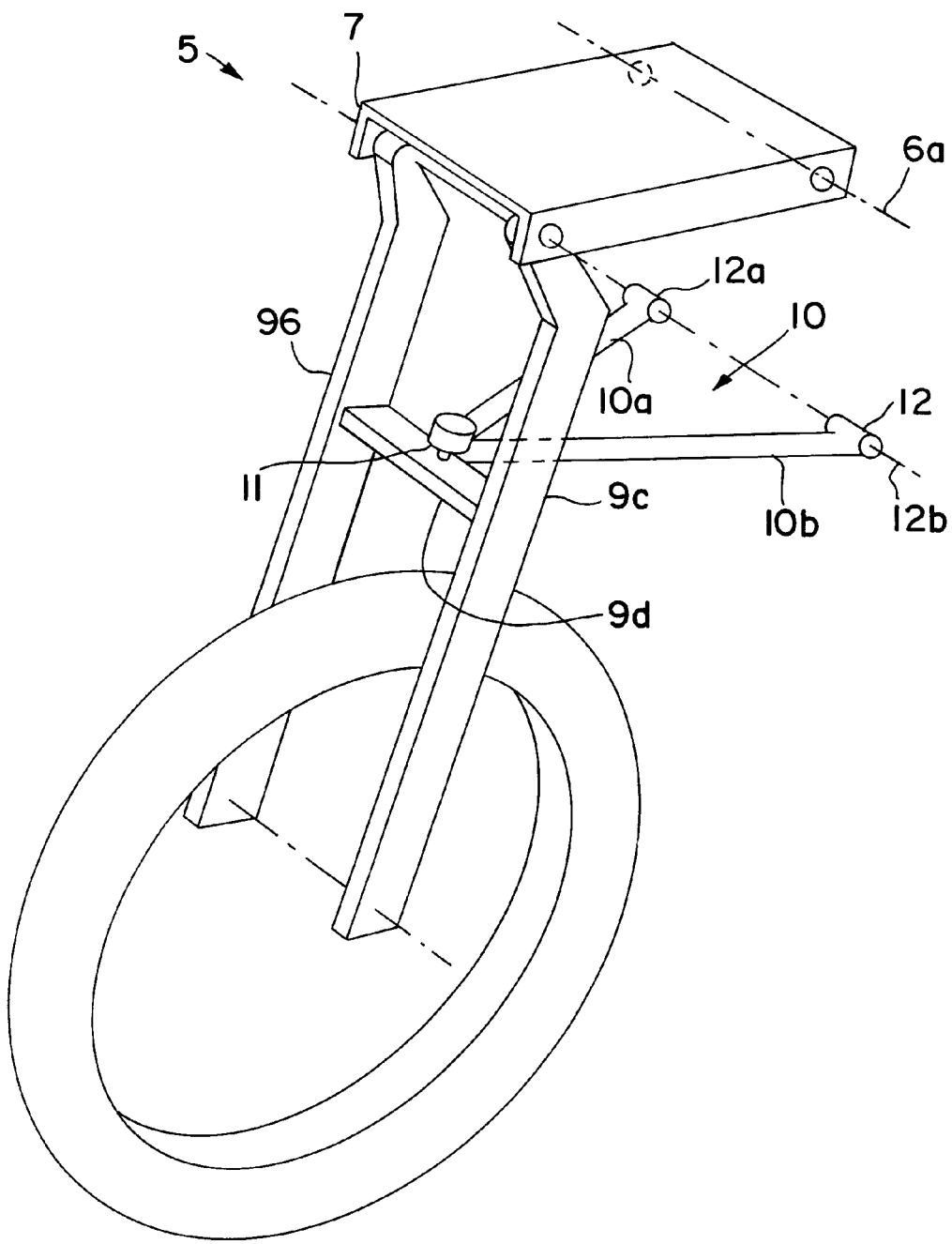
FIG. 2 shows in radial projection, from the front and obliquely from top right, the motor cycle parts according to FIG. 1.

In FIG. 2, two supporting members 9b and 9c are secured to the upper link unit 5 by the said bearing 7. The upper link unit can have a tetragonal horizontal section and at its front parts is mounted around or with a bearing axle 7 for the said supporting members 9b and 9c. The bearing function for the upper link unit also comprises a bearing axle 6a, on which link elements belonging to the link unit are rotatably or articulately mounted. According to FIG. 2, the lower link unit 10 can have a triangular horizontal section. The lower link unit is mounted via the said ball bearing 11 in or on the supporting members, for example in a transverse part 9d connecting the supporting members. Moreover, the lower link unit is mounted in bearing points 12, 12a. In principle, the lower link unit is therefore mounted about a bearing axle 12b. The lower link unit consists of two link elements 10a and 10b. The lower link element is mounted on the chassis by means of the base of the triangle, along which base the said bearing axle 12b extends.

The lower link unit can also effect springing for the supporting elements 9b, 9c as a result of torsion spring suspensions being able to be installed in the bearing functions or the bearing axles 12, 12a and 12b respectively.

Figure 2A:
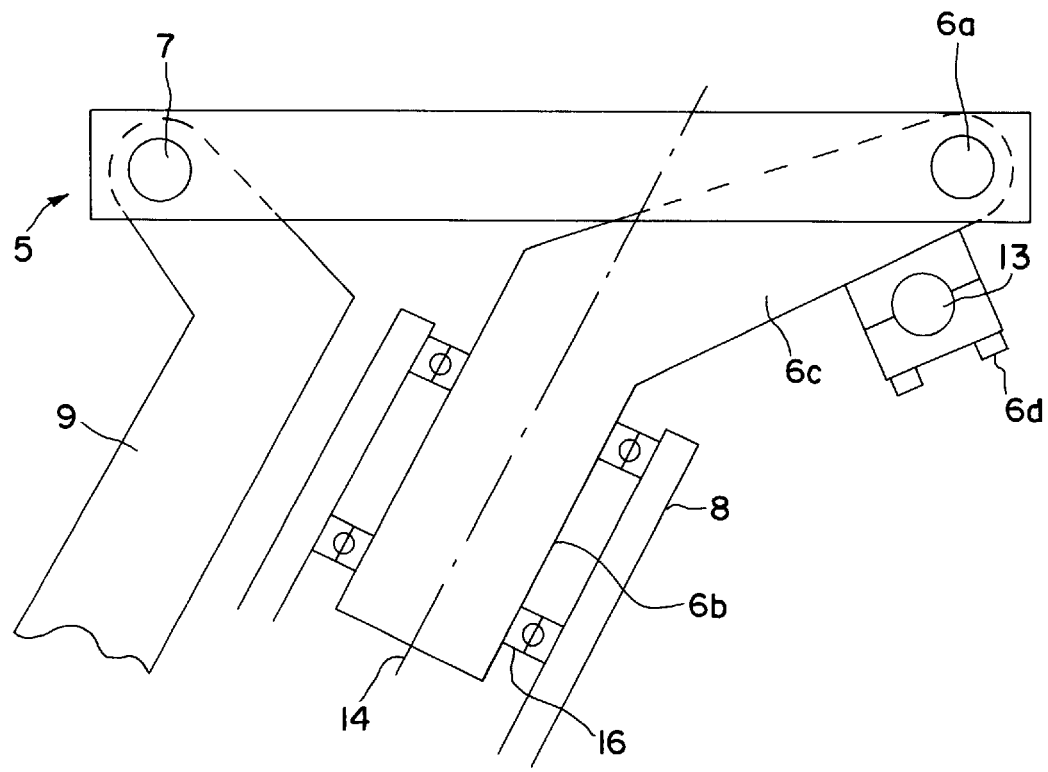
FIG. 2a shows, in side view and in enlarged representation in relation to FIGS. 1 and 2, an upper part of the front wheel suspension, with associated bearing units.

In FIG. 2a, the bearings of the upper link unit for the chassis and supporting members 9 are shown in greater detail. The bearing member comprises a part 6b which is essentially cylindrical in its lower section. By this part 6b, the bearing member is mounted in the bearing housing 8, which is fastened in the chassis/chassis frame. The mounting is effected with the aid of ball bearings 16 or other rotation-facilitating members. The bearing member merges at the top into a part 6c, which is pivoted in the shown longitudinal section of the upper link unit 5. In or at the transition between the said parts 6b and 6c, the part 6c widens rearwards towards the bearing function or the bearing axle 6a, at which the part 6c has essentially the same width as the link unit per se. On its bottom side, the bearing member part 6c supports retaining members for the said handlebar 13.

These retaining members are symbolized by 6d and can be constituted by a type which is known per se. The said steering line 14 extends in the longitudinal direction of the bearing member part 6b and the longitudinal axis of the bearing member part 6b coincides with the steering line 14 in the abovementioned initial position for the steering function. The upper parts of the supporting member 9 and supporting members 9b, 9c are mounted on the bearing axle 7 of the upper link unit. This mounting is articulated or rotatable.

Figure 2B:
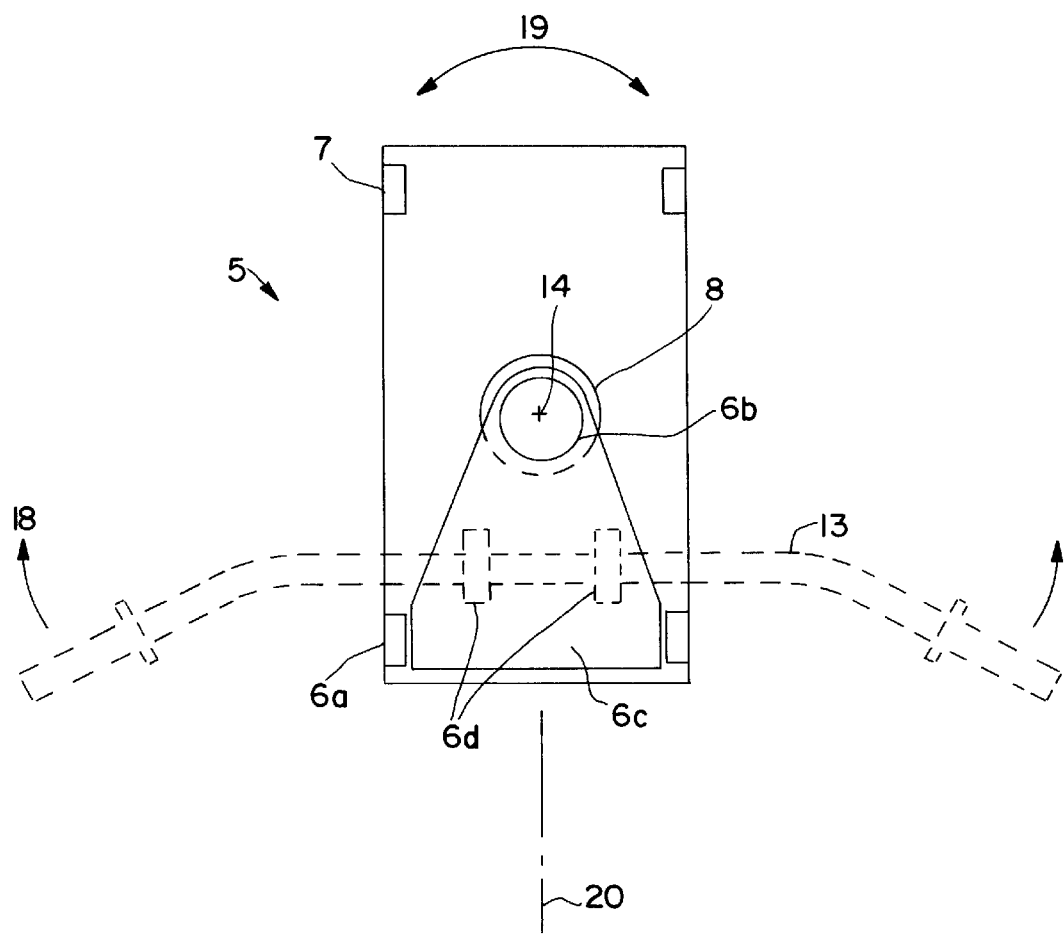
FIG. 2b shows in horizontal view from above the upper bearing unit according to FIG. 2a, FIG. 3 shows in radial projection, from the front and obliquely from top right, the structure of the upper bearing or link unit with its associated bearing members, as well as torsion or turning motions which can arise in connection with the driving of the vehicle.

FIG. 2b shows the rearward-widening extent for the bearing member part 6c. The bearing member part 6b in the bearing 8 is also evident. The securement of the handlebar 13 in two mutually spaced securement parts 6d can also be seen. The handlebar 13 can be assigned steering deflections in the directions of the arrows 17, 18, with the result that the supporting member(s) and the wheel according to the above are assigned turning motions 19 relative to the longitudinal axis 20 of the vehicle. The supporting member(s) is/are therefore turned about the steering line 14 by means of the bearing member part 6b. FIG. 2b further shows that the upper link unit can have an essentially rectangular horizontal section.

Figure 3:
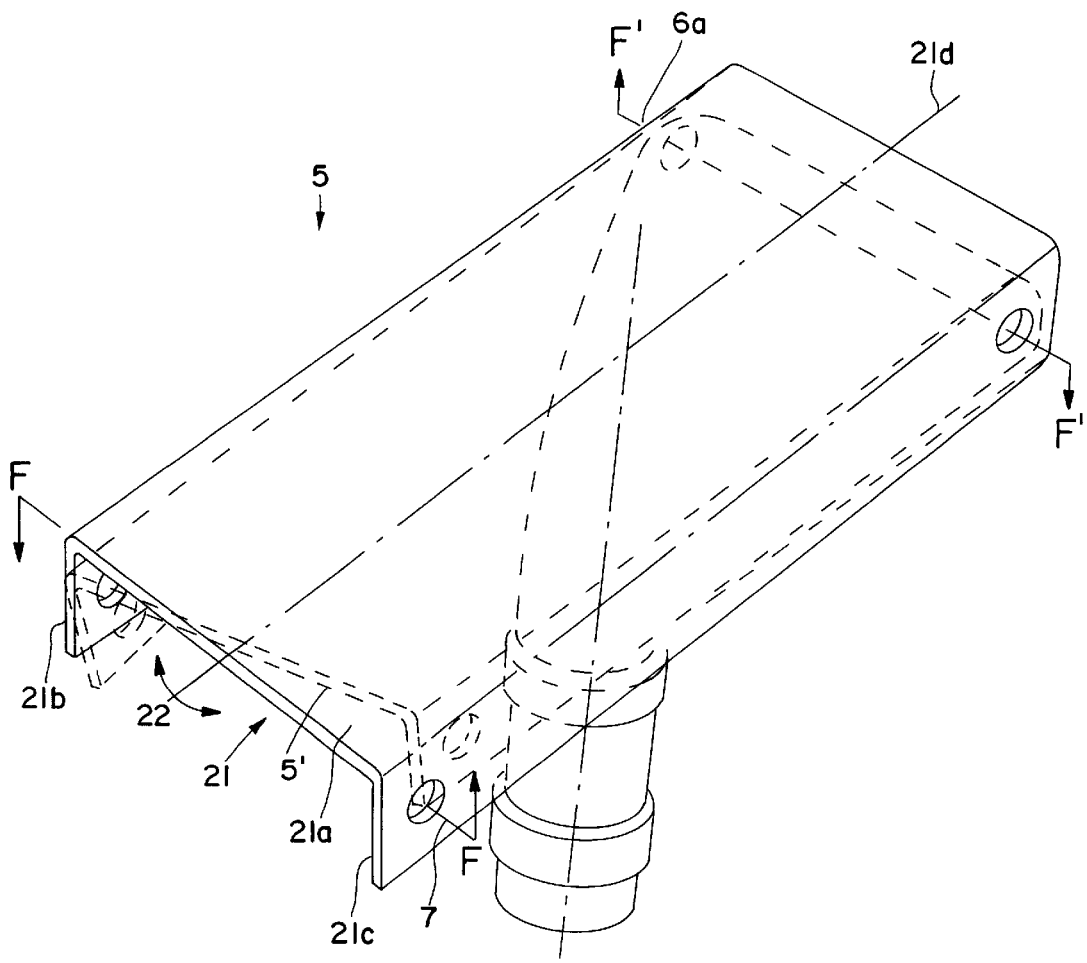

FIG. 3 shows an example of the configuration of the upper link unit. The upper link unit 5 can be configured as a U-beam 21. The U-beam can also be provided with side end parts (not shown), whereupon the link unit acquires a box shape. A characteristic of the invention is that the link unit 5 shall be able to execute torsion or turning motions in order to allow the said angular changes α (compare FIG. 1). In the example according to FIG. 1, these motions shall be executed essentially in the plane 21a of the U-beam. The bearing functions or bearing axles 7 and 6a are disposed in the respective side parts 21b and 21c of the U-beam. Upon the said angular changes according to the above, the bearings 7 and 6a of the U-beam are acted upon by opposing force couples F (upon the bearing 7) and F' (upon the bearing axle 6a), which force couples in principle are directed one towards the other. The torsion or turning motion in question therefore comes into being about the longitudinal axis 21a of the U-beam and causes a temporary deformation of the U-beam, which is symbolized by dashed lines 5' in FIG. 3. This compliance enables the supporting members 9 and the ball joint 11 to assume positions outside the steering line 14 according to FIG. 1. The deformed U-beam endeavours to return the steered-out wheel to its initial position and in the initial position of the wheel (i.e. the steering deflection=0) recovers its original shape. The steering-out takes place counter to the action of the spring-back deformation in the U-beam and the steering-out of the handlebar/wheel supporting member(s) can be linear or progressively increasing with the size of the steering deflection. A characteristic of the invention is also that the arrangement according to FIG. 3 shall be torsionally rigid for motions which are indicated by 22 in FIG. 3. The torsional rigidity shall therefore obtain for the upper link unit for motions in the direction of the arrows 22, viewed from the securement in or with the bearing axle 6a. Correspondingly, the lower link unit shall be torsionally rigid for motions in the direction of the arrows 24 according to FIG. 2, viewed from the securement or the bearing in connection with the securement points 12, 12a and the bearing axle 12b.

Figure 4:
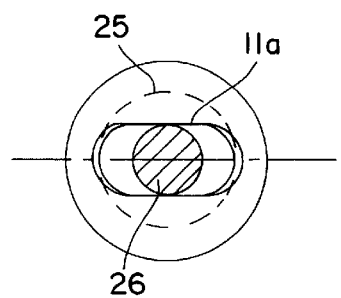
FIG. 4 shows the configuration of a ball joint, disposed in the lower bearing or link unit, in a wheel-supporting member.

FIG. 4 shows from the front the configuration of the ball bearing 11. The ball bearing has a recess 11a, which is elongated in the transverse direction and which allows relatively large lateral deflection for the supporting member 9 (compare FIG. 2) relative to the link elements in the lower link unit. The actual ball is denoted by 25 and the axle secured to the ball by 21. As a result of the shown structure, angular deflection can be obtained between ball joint and supporting member up to a range of 30–45°. The requirement for the angular deflection of the supporting member relative to the lower link unit in the direction perpendicular to the indicated direction is less and shall comply with the angular deflection α-symbol (compare FIG. 1). This angle can assume values between 0 and 5°.

Figure 5:
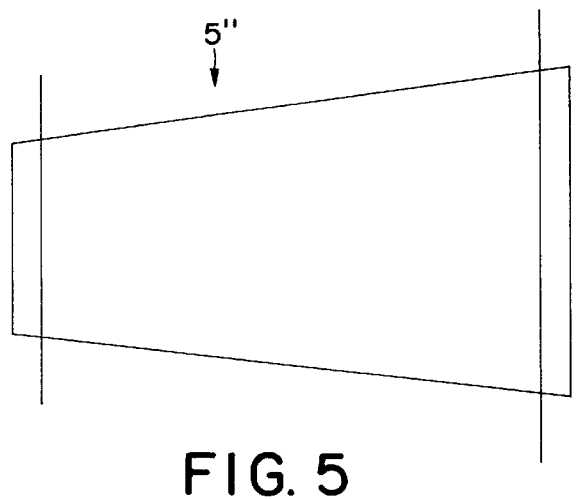
FIG. 5 shows in horizontal view and in basic representation an embodiment of the upper link unit which differs from the embodiments according to FIGS. 1, 2 and 3.

FIG. 5 shows an alternative embodiment of the horizontal section of the upper link unit having four corners and the unit narrower at the front, the upper link unit having been symbolized by 5".

Figure 6:
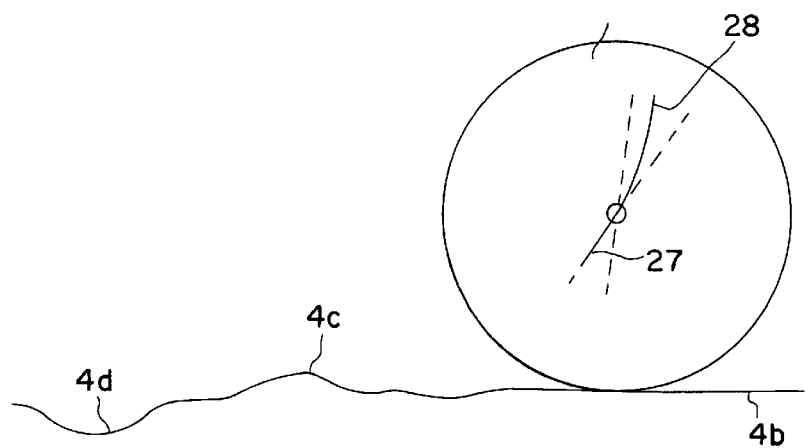
FIG. 6 shows in side view and in basic representation wheel motions established with the wheel suspension in different driving situations.

FIG. 6 sets out to show the motional directions for the various springing cases. When the cycle is driven on an essentially level support surface 4b, the springing function shall be able to effect springing motions 27 which essentially coincide with the longitudinal axis 9a of the supporting members. Whenever objects (for example stones) or obstacles 4c on the roadway are driven on or over or when pits or cavities 4d in the roadway are driven over, the spring suspension shall be able to effect springing motions 28 which essentially coincide with the vertical direction of the vehicle. An angle (the so-called angle of inclination) between the steering line 14 and a vertical line is indicated in FIG. 1 by Δ.

The supporting members can be arranged with supporting elements to imitate a conventional telescopic fork. At the upper parts of the supporting members, these are pivoted in the longitudinal section for interaction with the bearing function 7 and in order to escape from the bearing housing 8.

Figure 7:
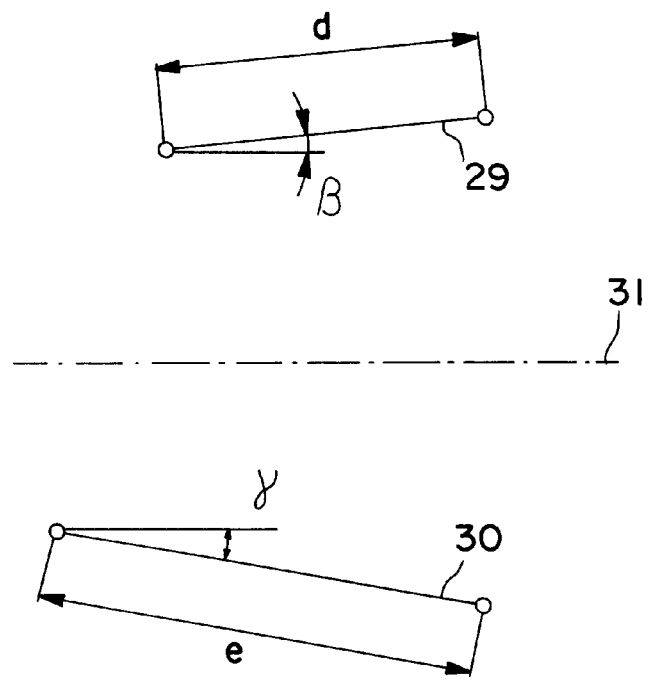
FIG. 7 shows in basic representation extents for link elements belonging to the upper and lower link units, which extents are related to the longitudinal section of the vehicle or link units.

FIG. 7 shows how various spring and motion geometries can be established for the resilient wheel suspension according to the invention. The extents for the link elements which belong to or form the said upper and lower link units are symbolized in the figure by 29 and 30 respectively. In order to achieve different or desired spring geometries, the said extents, which in the figure are indicated by d and e, are chosen with different values. The upper and lower link units can have mutually identical or different values. The said spring geometries are also chosen in dependence upon the angles β of the extents 29, 30 and in relation to a wave line 31 through the said longitudinal section.

Figure 8:
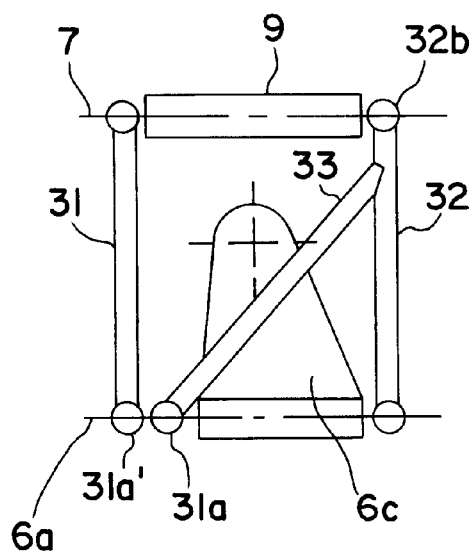
FIG. 8 shows in horizontal view and in basic representation an alternative realization of the upper bearing unit.

FIG. 8 shows from above an alternative embodiment of the first link unit, which here has two (parallel) link elements 21 and 32, the one of which interacts with a link element 33 which in the configuration (the horizontal view) extends essentially diagonally, further to which the elements are connected (articulately joined) to the supporting member 9 and the bearing member 6c by longitudinal axles 7 and 6a respectively. The bearings for the elements 31 and 32 are situated side by side and are indicated by 31a and 31a'. The element 32 is mounted on the bearing axle 6a and, jointly with the element 33, in the bearing point 32b for the bearing axle 7 on which the element 31 too is mounted. Even though the strength in this embodiment is not comparable with the embodiment according to FIG. 3, a strength is obtained which in certain cases is sufficient.

Figure 9:
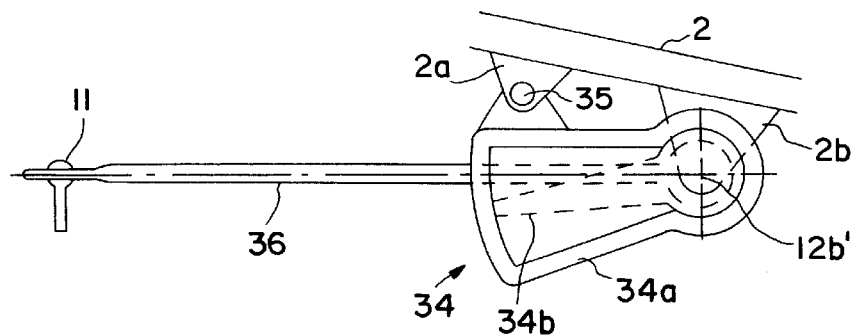
FIG. 9 shows in side view and in basic representation a wing damper arrangement used as a lower bearing unit.

According to FIG. 9, the link elements 10a, 10b in the embodiment according to FIG. 2 can be replaced by a wing damper arrangement 34, which is torsionally rigid perpendicular to the plane of the figure and can apply its steering-up action to the supporting member via the ball joint 11, everything viewed in the plane of the figure. The frame 34a of the wing damper is secured, articulately or rotatably in the plane of the figure, in bearing members 2a and 2b in the chassis 2 by means of bearing axles 35 and 12b'. The ball joint is fitted to a part 36. The wing damper arrangement is in this case such that the bearing unit can exercise its forced steering of the supporting member in the plane of the figure at the same time as the wing 34a and frame 34b of the wing damper exercise a wing damper function. The part 36 is in principle secured in a torsionally rigid manner to the bearing axle 12b' of the wing 34b.

Figure 10:
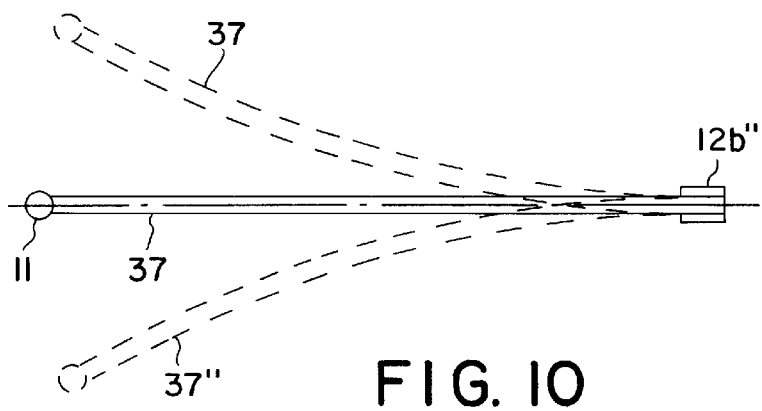
FIG. 10 shows in side view and in basic representation a leaf spring arrangement used as a lower bearing unit.

According to FIG. 10, the lower link unit can consist of a leaf spring 37, which is horizontally related to the vertical direction of the vehicle, which extends perpendicular to the plane of the figure in order to exercise torsional rigidity. The leaf spring supports the ball bearing 11 at the one end and is mounted in bearings 12b" which extend perpendicular to the plane of the figure analogously to the bearing axle 12b' in FIG. 9. The leaf spring 37 can assume various rebound positions 37', 37" when applying its forcible motion to the supporting member.

Figure 11:
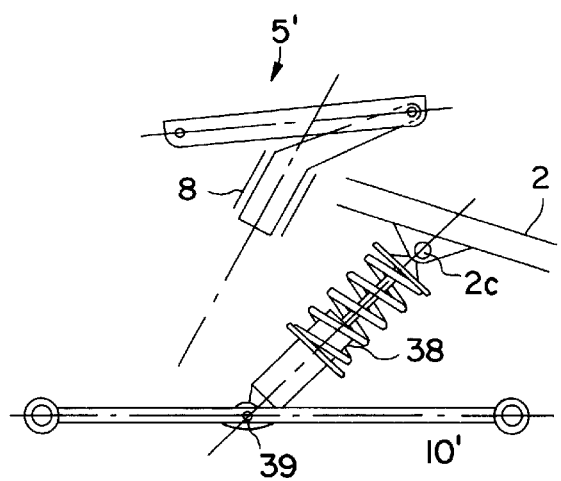
FIG. 11 shows in side view and in basic representation the securement to the chassis and shock absorbers) secured to the chassis and lower bearing unit.

FIG. 11 shows the coupling together of the link steering functions with one or more shock absorbers or other spring-effecting members. In the illustrative embodiment, a shock absorber is mounted in the lower unit 10', which thus according to the above can operate with a springing function of its own. The bearings (rotatable bearings) are arranged on a part 2c belonging to the chassis 2 and a part 39 belonging to the bearing unit 10'. A shock absorber can be arranged on the respective side of the bearing member 8.

Figure 12:
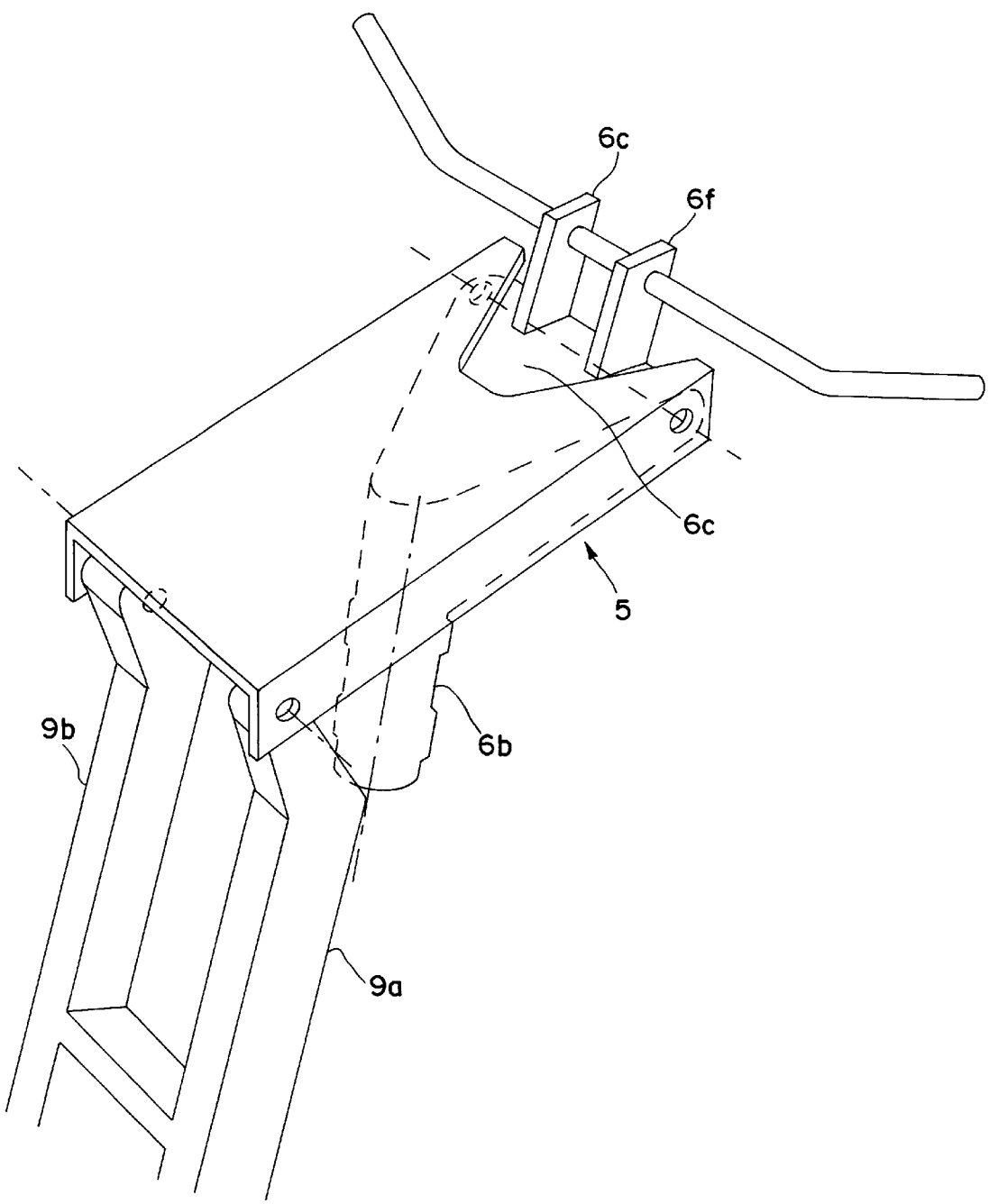
FIG. 12 shows in radial projection, from the front and obliquely from top right, in basic representation, an alternative securement of a handlebar to the lower bearing unit.

The embodiment according to FIG. 12 differs from the embodiment according to FIGS. 2a and 2b with regard to, inter alia, the securement or application of the handlebar 13 to the upper bearing unit 5, the bearing members 6b, 6c of which in this case have straight-rising or essentially straight-rising securement parts 6e and 6f, to which the handlebar is secured. The handlebar securement is in this case situated above the plane of the bearing unit/the U-beam-shaped unit. The unit 5 is mounted on the supporting members 9a, 9b and the chassis according to the above.

Figure 13:
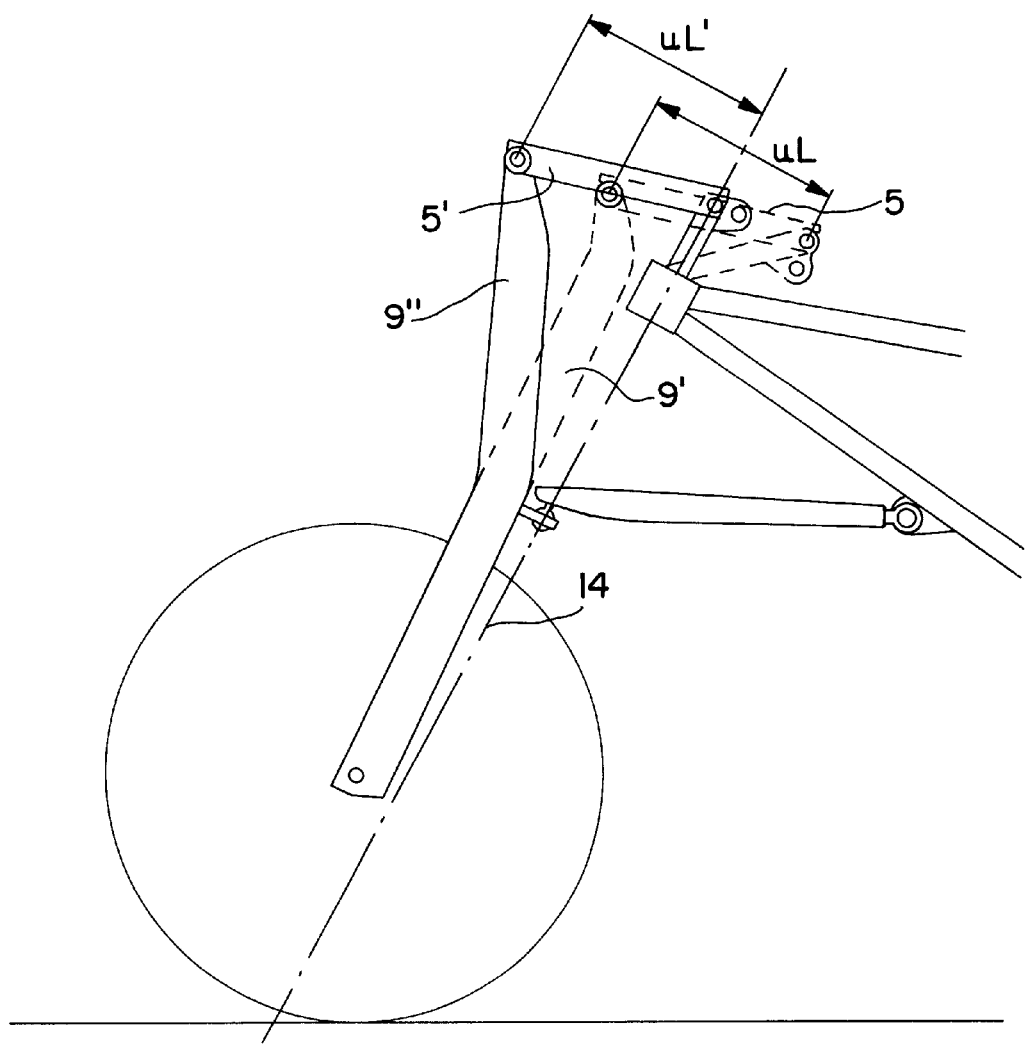
FIG. 13 shows the most proper position of a unit link.

The invention is not limited to the embodiments shown above but is subject to modifications within the scope of the following patent claims and the inventive concept. According to FIG. 13 the unit link 5 is centred around axis 14. The polar moment of inertia the will be lesser compared with the case in which the unit links takes the position indicated with 5'. The for member 9' then can be adapted substantially unbended, compare the case with position 5' and the bended fork member 9". The embodiment of unit link 5 and for member 9' having a greater advantages from the steering point of view. The length UL is crossed essentially in its middle parts. The less advantageous position 5' and 9" discloses the case in which the axis 14 crosses UL' in its rear parts or behind the rear parts.

What is claimed is:

1. Front wheel suspension on a vehicle having only one front wheel mounted in at least one supporting member, said at least one supporting member mounted to a chassis of the vehicle by an upper bearing unit and a lower bearing unit, said upper and lower bearing units each comprising one or more link elements, said lower bearing unit further comprising at least one springing member, said bearing units being configured to allow the at least one supporting member to resiliently move in a springing direction along a longitudinal axis of the at least one supporting member, said upper and lower bearing units being configured to effect a torsional rigidity against a cross-directional action of the supporting member relative to the chassis, said upper and lower bearing units being configured to allow steering of the only one front wheel about a rotational axis of the at least one supporting member while the at least one supporting member is resiliently moving in the springing direction, said upper bearing unit including a first bearing member secured to said at least one supporting member by a first link unit and a second bearing member secured to the chassis by a second link unit, said lower bearing unit including a third bearing member secured to said at least one supporting member by a third link unit and a fourth bearing member secured to the chassis by a fourth link unit, wherein the only one front wheel is turnable, and said upper bearing unit comprises at least one link element performing at least a part of a bearing function for the at least one supporting member and coupling to a steering linkage of the vehicle, wherein said upper bearing unit is arranged compliantly to provide a torsion or turning motion effect in the upper bearing unit whenever said at least one supporting member and the only one front wheel are allotted a steering or turning motion about the rotational axis of the at least one supporting member.

2. Front wheel suspension according to claim 1, wherein at least one of the upper and lower bearing units are coupled to and cooperate with shock absorber members.

3. Front wheel suspension according to claim 1, wherein the upper bearing unit is configured as a tetragon, with bearing points of the first link unit being secured to the at least one supporting member at two front corners of the tetragon configuration, and bearing points of the second link unit being secured to the chassis at rear corners of the tetragon configuration.

4. Front wheel suspension according to claim 1, wherein the second bearing member of the upper bearing unit is secured to a rear part of the second link unit by a second bearing extending in the longitudinal direction of the second link unit, said second bearing comprising a transverse second bearing axle, wherein said at least one supporting member is mounted on the upper bearing unit on a front part thereof by a first bearing axle, said first bearing axle extending in a transverse direction of the upper bearing unit, said torsion or turning motion effect in a plane of the upper bearing unit inducing opposite turning motions on the first and second bearing axles about a longitudinal axis of the plane, wherein an initial position of the longitudinal axis is parallel with a longitudinal axis of the vehicle.

5. Front wheel suspension according to claim 4, wherein the second bearing member of the upper bearing unit comprises a first part which coincides with a steering line of the vehicle in said initial position, said first part being mounted in a bearing housing secured to the chassis, wherein the second bearing member further comprises a second part which is pivoted in a longitudinal section of the vehicle and which, at a back part, interacts with said second bearing.

6. Front wheel suspension according to claim 5, wherein the pivoted second part of the second bearing member widens rearwards or upwards in a latitudinal direction of the pivoted second part so as, at the back part, to acquire a width which essentially corresponds to a rear width of the upper bearing unit.

7. Front wheel suspension according to claim 1, wherein the upper bearing unit comprises at least one link element extending in a forward direction of the first bearing unit.

8. Front wheel suspension according to claim 1, wherein the second bearing member of the upper bearing unit comprises a first part mounted in a bearing housing containing at least one ball bearing.

9. Front wheel suspension according claim 1, wherein the third bearing member of the lower bearing unit in the at least one supporting member comprises a ball joint.

10. Front wheel suspension according to claim 1, wherein the lower bearing unit comprises link elements arranged to form a triangle in which the third bearing member is situated at an apex of the triangle, and the fourth bearing member is secured to the chassis at two corners of a base of the triangle.

11. Front wheel suspension according to claim 1, wherein the at least one springing member of the lower bearing unit is arranged in a longitudinal direction relative to a longitudinal section of the vehicle to perform a spring function, with said at least one springing member being secured between a transverse bearing axle in the chassis and a ball joint bearing in the at least one supporting member.

12. Front wheel suspension according to claim 1, wherein the fourth bearing of the lower bearing unit, on a transverse bearing axle, extends in a transverse direction of the vehicle.

13. Front wheel suspension according to claim 11, wherein a means for performing a springing function is coupled to the third and fourth bearing members and said wheel-supporting member and chassis.

14. Front wheel suspension according to claim 1, wherein a motion geometry defined by the upper and lower bearing units is chosen by either selecting a longitudinal extent of at least one of the upper and lower bearing units, or an extent of the link elements of the upper and lower bearing units in a principal longitudinal section of the upper and lower bearing units, or an extent of the link elements in a longitudinal direction of the vehicle.

15. Front wheel suspension according to claim 1, wherein a motion geometry defined by plural link units is chosen by either a mutual angular setting between said plural link units, or angular settings of said plural link units relative to a horizontal line in a longitudinal direction of the vehicle.

16. Front wheel suspension according to claim 1, wherein a motion geometry is chosen by either sizing a dimension of the one or more link elements, or by a choice of material of said one or more link elements, or both, wherein said dimension is one of a diameter, a width and a thickness of the one or more link elements, wherein the choice of material is one of a metal and a composite.

17. Front wheel suspension according to claim 1, wherein a rigidity of each of the upper and lower bearing units in a respective horizontal plane is chosen by either an extent in a transverse direction of a link element of an associated bearing unit, or one of a material and a thickness of the upper and lower bearing units, or both.

18. Front wheel suspension according to claim 1, wherein the upper bearing unit comprises a U-beam shaped link element selected from the group consisting of a composite, an alloy, and a metal material.

19. Front wheel suspension according to claim 1, wherein the upper bearing unit comprises two side link elements and an element extending diagonally between the side link elements.

20. Front wheel suspension according to claim 18, wherein the first and second bearing members of the upper bearing unit are arranged on a rear and a front side of the U-beam shaped link element.

21. Front wheel suspension according claim 1, wherein a motion geometry and an interaction with either of a shock absorber or the at least one springing member gives rise to a springing motion for the only one front wheel and the at least one supporting member, wherein said spring motion comprises a motional component coinciding with either a rearward slope or a steering line of the at least one supporting member, and a motional component which has a part which coincides with a vertical direction with respect to the vehicle.

22. Front wheel suspension according to claim 1, wherein the only one front wheel is non-resiliently mounted in the at least one supporting member.

23. Front wheel suspension according to claim 1, wherein the upper bearing unit also supports a handlebar of the vehicle.

24. Front wheel suspension according to claim 1, wherein both the upper and lower bearing units are situated above the only one front wheel and the lower bearing unit is situated directly above the only one front wheel.

25. Front wheel suspension according to claim 1, wherein the at least one supporting member comprises at least two supporting elements, between which the only one front wheel is mounted.

26. Front wheel suspension according to claim 23, wherein a twisting or a torsion motion of the upper bearing unit is related to a steering force exerted upon the handlebar.

27. Front wheel suspension according to claim 1, wherein a steering force increases with an increasing wheel turn deflection.

28. Front wheel suspension according to claim 1, wherein the vehicle is a motorcycle.

29. Front wheel suspension according to claim 1, wherein the at least one supporting member is rearward-sloping.

30. Front wheel suspension according to claim 11, wherein the at least one springing member of the lower bearing unit comprises a leaf spring.

31. Front wheel suspension according to claim 11, wherein the at least one springing member of the lower bearing unit is secured in a wing damper arrangement.

32. Front wheel suspension according to claim 10, wherein a transverse direction of the vehicle is along at least a part of the base of the triangle.

* * * * *